874X
R. P. Cunningham,
Cheese Press.
Patented May 21, 1808.
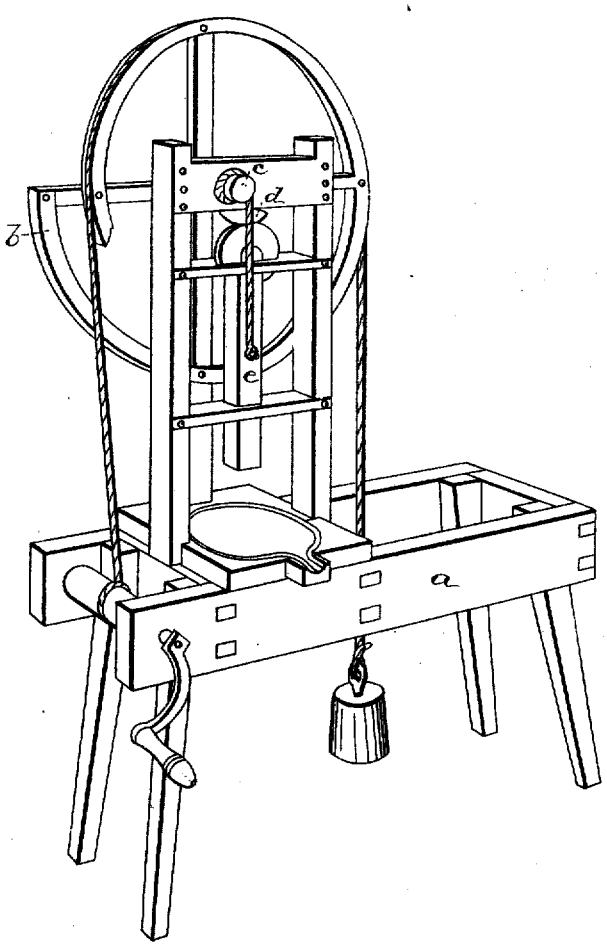
AM. PHOTO-LITHO. CO. N.Y. (OSBORNE'S PROCESS)

874X May 21 1808

Robert Pierpont Cunningham

Letters Patent

The schedule referred to in these Letters Patent and making
part of the same, containing a description in the words of
the said Robert Pierpont Cunningham himself of his machine
for pressing.

This press consists of the frame, the wheel, arms, and axis
the thruster connected with the axis and the presser or beam,
The frame of this press may be made of metal or wood, as the use
to which it is applied shall dictate to be best, and its form will
vary accordingly; so as to render unnecessary any particular speci
-fication thereof. The wheel or arms by which motion may be commu
nicated will also be various, it may be either a wheel in the
rim of which passes a rope or a chain for the purpose of sustain
-ing a weight adequate to give the pressure; or a toothed wheel
which is turned by a crank or pinion as in the screw jack, or
loaded arms, or a lever, The arms or spokes of the wheel may
pass through perforations of the axis if the axis should be of metal
or they may be fixed in mortises in the axis; or the wheel and axis
may be of one substance cast or framed together – These things
depending on the opinion of the constructor, or the purposes for
which the press is intended, The axis of these wheels, arms &c
bear the thruster, hereinafter specified: as also on one end
thereof a cylindrical barrel round which winds a rope or
chain that brings back the beam or presser, after the pressing
is performed, or if necessary two ropes, or chains, one on each
side the thruster, this barrel is of any diameter which the
constructor chooses, greater or less than that of the axis, as the power
to be applied, or other circumstances shall determine — The thru
-ster

3794X on which the merit of this machine depends and which I claim exclu-
sively as my invention, is a tooth or cam attached to the axis above
mentioned, and of a spiral figure which shall drive the presser
and bear upon it with an equal force in every situation, It may
either make whole revolutions, or a part only of a revolution accor-
ding to the distance the presser has to be moved. Its form is such
that it drives the presser in a direct line with a constant &
uniform force; and may be thus described or delineated
First draw a circle of the diameter of the barrel round
which the rope or chain coils. that brings back the beaver of
the press after the pressure is effected then draw the line of a
diameter of that circle to intersect the periphery of a concentric
circle whose diameter is equal to the axis of the wheel a tan-
gent drawn from this point to intersect another tangent drawn from
the end of one of the radii of the barrel which shall be perpen-
-dicular to the diameter first drawn, will give a point at which
the spiral commences, the part within the line of the tangent first
mentioned forming part of the tooth. Then draw as many tangents
to the barrel as may be thought necessary, and upon them lay
off a distance equal to the radius of the axis of the wheel, added
to that part of the periphery of the barrel which is between the
end of the perpendicular radius above mentioned and the point in
the periphery from which the tangent is drawn, The points thus
found will be those through which will pass the spiral curve of the
thruster. Allowance must be made in describing the curve of the
thruster, for the thickness of the rope or chain which winds round
the barrel; this allowance cannot be particularly specified as
it will depend on circumstances, The thruster may be made of
any proper substance as hard wood, or metal. The presser. or
beaver, or tongue of the press is a straight beam against one end
of which the thruster acts and propels it forward, A friction
wheel may be placed at the end of this beaver, which is acted
upon by the thruster the point of contact of the thruster and 0747 22 friction wheel being in the line of the motion of the beam or press and the axis of the friction wheel. The edge or circular [illegible] of this friction wheel which is acted upon by the thruster will be left rounded so as to approach the form of the middle portion of a sphere, or indented together with the cam or thruster, in this case the moving power may be applied to the friction wheel and produce an increasing pressure I contemplate applying this press to all cases where a great force and constant pressure is required and where the distance through which the presser or tongue passes is not large as in the pressures for cheese, Scraps &c. for Book Binders Clothiers, Dyers Printers &c and the pressure upon drills and in Mechanical operations, or it may be used for moving heavy bodies a small distance either by the thruster or as a wheel and axis or both in the same Robert Pierpont Cunningham Witnesses
Richd King
William Thornton
(Drawing made.)

(Patented May 21. 1808.)

[illegible]